US007568203B2

(12) United States Patent  (10) Patent No.: US 7,568,203 B2
Dotan et al.  (45) Date of Patent: Jul. 28, 2009

(54) MOBILE DEVICE WITH LOCAL SERVER

(75) Inventors: Emanuel Dotan, Kfar Vradim (IL); Michael Menachem Kupferman, Zichron Ya'akov (IL); Adi Avram, Haifa (IL)

(73) Assignee: Telmap Ltd, Herzlia (IL)

( * ) Notice: Subject to any disclaimer, the term of this patent is extended or adjusted under 35 U.S.C. 154(b) by 593 days.

(21) Appl. No.: 10/871,954

(22) Filed: Jun. 18, 2004

(65) Prior Publication Data

US 2005/0282532 A1 Dec. 22, 2005

(51) Int. Cl.
*G06F 9/46* (2006.01)
*G06F 9/455* (2006.01)

(52) U.S. Cl. .............................. 719/328; 719/313; 718/1
(58) Field of Classification Search ...................... 718/1, 718/100; 719/310, 328, 311, 313; 710/1; 709/226–228; 455/456.3, 457, 13.1, 418, 455/419; 707/10
See application file for complete search history.

(56) References Cited

U.S. PATENT DOCUMENTS

| | | | |
|---|---|---|---|
| 4,571,684 A | 2/1986 | Takanabe et al. | |
| 5,689,717 A | 11/1997 | Pritt | |
| 5,724,072 A | 3/1998 | Freeman et al. | |
| 5,988,853 A | 11/1999 | Kim et al. | |
| 6,038,559 A | 3/2000 | Ashby et al. | |
| 6,565,610 B1 | 5/2003 | Wang et al. | |
| 6,643,650 B1* | 11/2003 | Slaughter et al. ............. 707/10 |
| 6,678,535 B1* | 1/2004 | Narayanaswami .......... 455/557 |
| 6,747,649 B1 | 6/2004 | Sanz-Pastor et al. | |
| 6,826,385 B2* | 11/2004 | Kujala ...................... 455/13.1 |
| 6,834,195 B2* | 12/2004 | Brandenberg et al. .... 455/456.3 |
| 6,854,115 B1* | 2/2005 | Traversat et al. .............. 718/1 |
| 6,898,516 B2 | 5/2005 | Pechatnikov et al. | |
| 6,931,429 B2* | 8/2005 | Gouge et al. ................ 709/203 |
| 6,934,755 B1* | 8/2005 | Saulpaugh et al. .......... 709/226 |
| 6,970,869 B1* | 11/2005 | Slaughter et al. ............. 707/10 |
| 7,117,266 B2* | 10/2006 | Fishman et al. ............. 709/228 |
| 2002/0111146 A1* | 8/2002 | Fridman et al. ............... 455/99 |
| 2003/0117297 A1 | 6/2003 | Obradovich et al. | |
| 2003/0229441 A1 | 12/2003 | Pechatnikov et al. | |
| 2004/0058652 A1* | 3/2004 | McGregor et al. ........ 455/67.13 |
| 2005/0021876 A1* | 1/2005 | Asai et al. ...................... 710/1 |

FOREIGN PATENT DOCUMENTS

EP 1 186 863 3/2002

OTHER PUBLICATIONS

"Platform Abstraction of Input Method Using Proxy Server", IBM Technical Disclosure Bulletin, IBM Corp. New York, U.S. vol. 40, No. 4, Apr. 1, 1997.

* cited by examiner

*Primary Examiner*—Van H Nguyen
(74) *Attorney, Agent, or Firm*—Gerald T. Shekleton; Husch Blackwell Sanders Welsh & Katz

(57) ABSTRACT

A method for operating a mobile computing device includes running a platform-independent application program using a virtual machine operating on the mobile computing device. A server program runs on the mobile computing device so as to access a native function of the mobile computing device that is not supported by the virtual machine. The native function is invoked from the application program by opening a communication connection to the server program using a communication application programming interface (API) of the virtual machine, and sending a message to the server program via the communication connection, so as to cause the server program to access the native function.

23 Claims, 2 Drawing Sheets

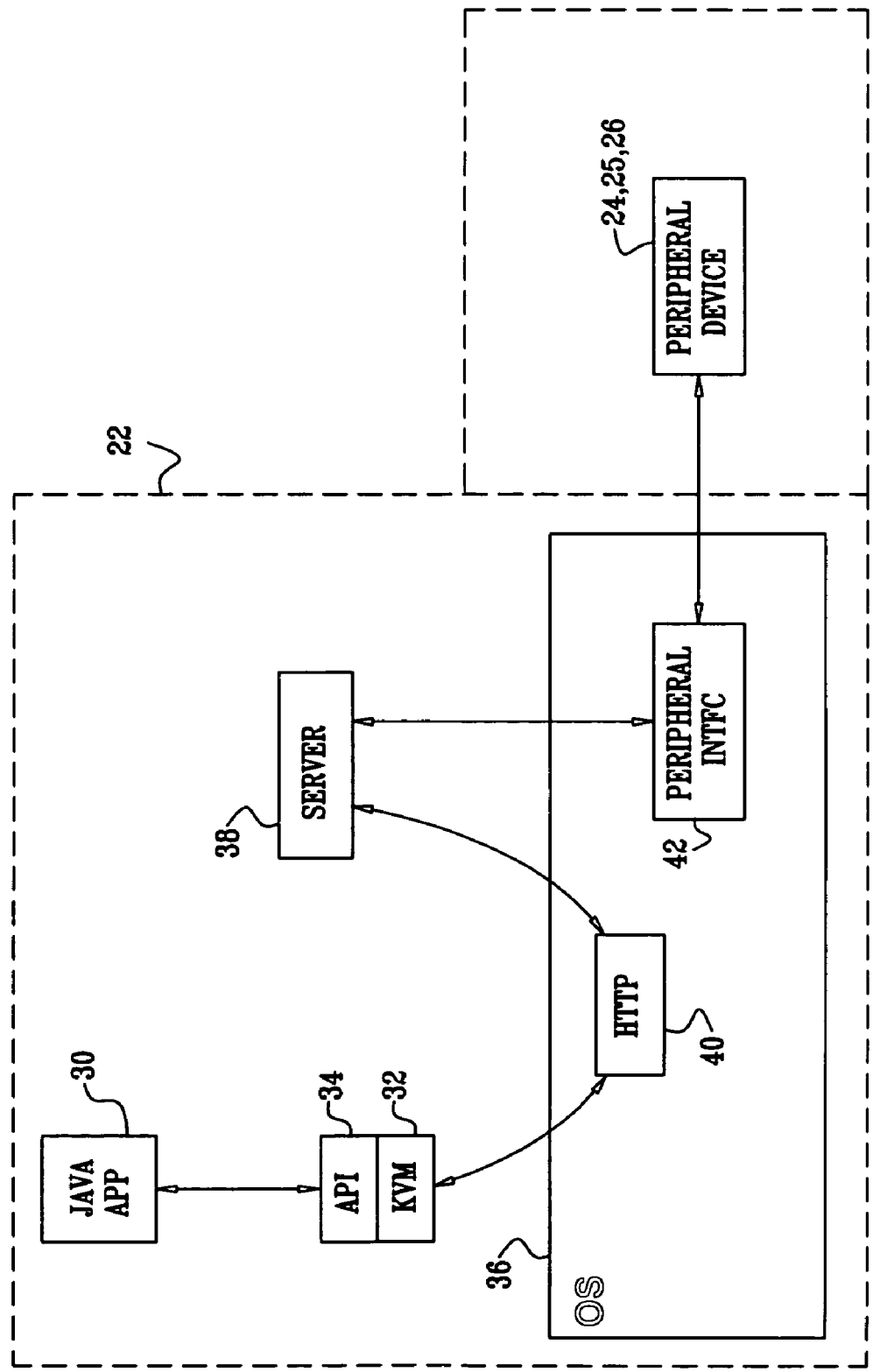

MOBILE DEVICE WITH LOCAL SERVER

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to software applications for mobile computing devices, and specifically to enhancing the functionality of applications that run in a virtual machine environment.

BACKGROUND OF THE INVENTION

Java™ is a platform-independent programming language, developed by Sun Microsystems. An integral component of the Java architecture is the Java Virtual Machine (JVM), which is available on numerous computing platforms in order to provide Java with a high level of platform-independence. The Java 2 Platform, Micro Edition (J2ME™), specifies a scaled-down version of the JVM, known as the K Virtual Machine (KVM), which is designed for mobile wireless information devices such as cellular telephones and personal digital assistants (PDAs).

J2ME currently provides two configurations: Connected Limited Device Configuration (CLDC) and Connected Device Configuration (CDC). CDC was developed for more powerful devices, and therefore supports a full Java 2 Virtual Machine. CLDC is targeted at devices with limited memory and/or processing power, and does not support the full set of standard Java 2 Standard Edition (J2SE) Application Programming Interfaces (APIs). CLDC includes a core development library and specifies the KVM. A Mobile Information Device Profile (MIDP) is layered on top of CLDC and defines a limited set of Java APIs that provide an application runtime environment for mobile information devices, such as mobile telephones and personal digital assistants (PDAs). These APIs, which have the form of classes grouped in class libraries, include the user interface, networking and messaging. MIDP applications that use the MIDP and CLDC APIs are known as MIDlets.

J2SE provides a Java Native Interface (JNI), which is a standard programming interface for writing Java native methods. "Native" in this sense refers to functions of the operating system (OS) that are not accessed via the standard Java APIs. The JNI permits programmers to take advantage of platform-specific functionality outside of the JVM by integrating native code with programs written in Java. Programmers can use the JNI to write native methods to handle situations in which an application cannot be written entirely in the Java programming language. It is useful particularly when the standard Java class library does not support platform-dependent features needed by the application. J2ME, however, does not provide JNI support.

SUMMARY OF THE INVENTION

Because of the lack of JNI support in J2ME, a programmer working in J2ME is not able to access directly native OS functionality. As a result, given the limited set of APIs that are available in J2ME, some mobile device functions are inaccessible to the programmer.

In response to these shortcomings, some embodiments of the present invention provide a native interface server, which runs in software on a mobile device alongside a virtual machine, such as the KVM. Platform-independent application programs, such as programs written in J2ME, communicate with the server using communication APIs that are provided by the virtual machine. These APIs invoke standard communication protocols that are also supported by the native OS. For example, the application program may use an API of the virtual machine to communicate with the server over a TCP connection, possibly using HTTP requests and responses. Alternatively, the application program may communicate with the server by sending and receiving User Datagram Protocol (UDP) packets, if supported by the KVM. Using the communication protocol, the application program may send a message to the server to call a certain native function. The server runs the function and then returns the results in a similar message to the application program.

Although the embodiments described herein make reference specifically to J2ME and the Java KVM, the principles of the present invention may similarly be applied to platform-independent applications that run on virtual machines of other sorts.

There is therefore provided, in accordance with an embodiment of the present invention, a method for operating a mobile computing device, including:

running a platform-independent application program using a virtual machine operating on the mobile computing device;

running a server program on the mobile computing device so as to access a native function of the mobile computing device that is not supported by the virtual machine; and invoking the native function from the application program by:

opening a communication connection to the server program using a communication application programming interface (API) of the virtual machine; and sending a message to the server program via the communication connection, so as to cause the server program to access the native function.

In a disclosed embodiment, running the platform-independent application program includes running a Java program using a K Virtual Machine (KVM).

Typically, invoking the native function includes invoking an input/output (I/O) function of the mobile computing device that is not supported by the virtual machine. The I/O function may include one or more of receiving data via a communication port of the mobile computing device, playing a sound, driving a display of the mobile computing device, and operating a backlight of a display of the mobile computing device.

Typically, invoking the native function includes interacting with a peripheral device.

In disclosed embodiments, opening the communication connection includes opening the connection using a network communication protocol. In one embodiment, using the network communication protocol includes opening a Transmission Control Protocol/Internet Protocol (TCP/IP) connection, and sending the message includes sending a Hypertext Transfer Protocol (HTTP) request to a Uniform Resource Identifier (URI) that is associated with the server program. In another embodiment, sending the message includes sending a User Datagram Protocol (UDP) packet.

Typically, the method includes sending a reply to the message from the server program to the application program returning a result of the native function.

There is also provided, in accordance with an embodiment of the present invention, a mobile computing device, including a microprocessor, which is programmed to run a platform-independent application program using a virtual machine operating, and to run a server program so as to access a native function of the mobile device that is not supported by the virtual machine, and which is programmed to invoke the native function from the application program by opening a communication connection to the server program using a communication application programming interface (API) of the virtual machine, and sending a message to the server program via the communication connection, so as to cause the server program to access the native function. The present invention will be more fully understood from the following detailed description of the embodiments thereof, taken together with the drawings in which:

BRIEF DESCRIPTION OF THE DRAWINGS

FIG. 2 is a block diagram that schematically illustrates software components running on a computing device, in accordance with an embodiment of the present invention.

DETAILED DESCRIPTION OF EMBODIMENTS

Figure 1:
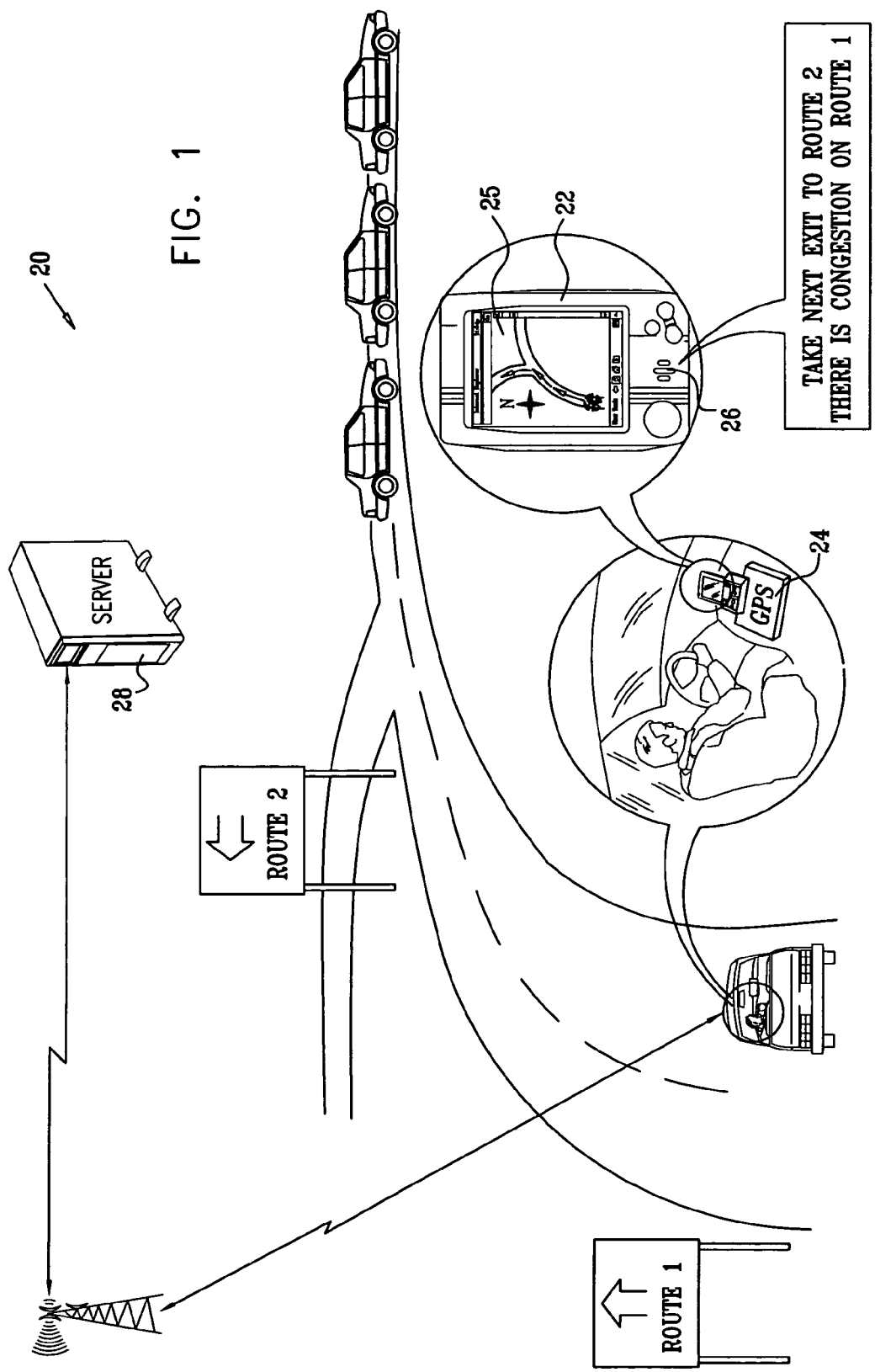
FIG. 1 is a schematic, pictorial illustration of a navigation system using a mobile computing device, in accordance with an embodiment of the present invention.

FIG. 1 is a schematic, pictorial illustration of a navigation system 20, based on a mobile computing device 22, in accordance with an embodiment of the present invention. System 20 is shown as an example of an application in which the principles of the present invention may be used in the programming and operation of mobile device 22, so as to access native functions that are not available via the standard APIs of the J2ME KVM. These functions include, for instance, interaction with peripheral devices and input/output (I/O) ports, playing sounds, generating vibration, direct writing to a display screen 25 of device 22, and controlling the backlight of the display screen. Other examples of native functions that may be accessed in the manner described hereinbelow, as well as other applications in which these functions may be used, will be apparent to those skilled in the art and are considered to be within the scope of the present invention.

In the exemplary application shown in FIG. 1, mobile device 22 typically comprises a cellular telephone or a personal digital assistant (PDA) with cellular communication capabilities. Device 22 comprises a microprocessor, which is programmed in software to carry out the functions described hereinbelow. The mobile device communicates over a wireless link with a server 28, in order to download maps and instructions for use by a driver of a vehicle. Device 22 comprises a serial port, which is coupled to receive position readings from a position sensor 24, such as a Global Positioning System (GPS) device. These position readings are used in determining the location of the vehicle relative to the map provided by server 28 and in generating instructions to the driver as the vehicle proceeds along its course. Device 22 renders the appropriate map segments to display 25, and may also provide verbal instructions to the driver via an audio speaker 26. Further details of this navigation method and system are described in U.S. patent application Ser. No. 10/426,947, filed Apr. 30, 2003 (published as US 2003/0229441 A1), now U.S. Pat. No. 6,917,878, whose disclosure is incorporated herein by reference.

FIG. 2 is a block diagram that schematically illustrates software components running on device 22, in accordance with an embodiment of the present invention. The map download and navigation functions of device 22 are performed by an application 30, such as a MIDlet, which is written in the Java language in accordance with the J2ME specification. Application 30 runs on a KVM virtual machine 32, with which the application interacts by means of APIs 34, as described in the Background of the Invention. Machine 32 is supported by an operating system (OS) 36 of device 22, such as the Symbian OS (supplied by Symbian Ltd., London, UK).

OS 36 includes peripheral device drivers 42 for interfacing with peripheral devices (such as display 25 and speaker 26 within device 22, and I/O interfaces to external devices such as sensor 24). APIs 34 of virtual machine 32, however, do not enable application 30 to access these drivers. To overcome this limitation, a native interface server 38 runs in software on device 22. Server 38 typically runs as an application process on OS 36, alongside virtual machine 32. Software code for server 38 may be written in any suitable programming language, such as C or C++, using APIs provided by OS 36 to access peripheral devices 24, 25, 26 via drivers 42. Thus, in the present example, server 38 may be capable of receiving GPS data through a serial port of device 22, rendering map images to display 25, and playing sounds via speaker 26.

OS 36 also provides a communication API 40 (or a set of communication APIs), which is used by both virtual machine 32 and server 38. Java application 30 is able to access the communication functions of API 40 via appropriate calls to Java APIs 34. Communication API 40 generally includes both transport- and session-layer support. At the transport layer, the communication API provides a Transmission Control Protocol/Internet Protocol (TCP/IP) stack, which is typically used in establishing TCP/IP connections between applications running on mobile device 22 and external servers. Other protocols may also be supported. At the session layer, communication API 40 provides a Hypertext Transfer Protocol (HTTP) interface, which may be used by device 22 to communicate (over a TCP/IP connection) with HTTP servers on the Internet.

In the present embodiment, on the other hand, communication API 40 is used internally, within device 22, to support communication between application 30 and server 38. This novel use of the communication API permits application 30 to access the native functions of OS 36 via the server. For example, in order to receive location data from GPS 24, application 30 may invoke a socket API (among APIs 34 of KVM 32) in order to open a TCP/IP connection. This API is normally intended for network communications, but in this case is invoked by application 30 in order to open an internal TCP/IP connection to server 38. For this purpose, application 30 and server 38 typically have their own, separate ports. In response to the API call by application 30, KVM 32 invokes communication API 40 of OS 36 in order to open the desired connection.

Once the connection is opened, application 30 sends a message over the connection to server 38, indicating the name of the native function that application 30 would like server 38 to execute and the parameters of the function. A function "GPS( )," for example, might cause the server to read data from GPS 24 via the serial port of device 22, and then return a message to application 30 giving the current reading. Other functions might cause the server to render a specified object to display 25 or play certain sounds via speaker 26.

Optionally, the message sent by application 30 may have the form of a HTTP request, using the HTTP functionality of APIs 34 and 40. The HTTP request in this case is directed to a known uniform resource identifier (URI) of server 38. A different URI may be defined for each of the native functions that the server is capable of performing. Server 38 then returns a message to application 30 in the form of a HTTP response. TCP/IP and HTTP are generally convenient choices of protocols to use, since they are standardized, widely supported by different operating systems, and familiar to most programmers. Alternatively or additionally, other suitable protocols may be used for communication between virtual machine 32 and server 38.

Appendix A below provides an example of source code used for controlling the backlight of display 25 on device 22, in accordance with the methods described above. In this example, Java application 30 sends one byte to turn the backlight on, and another to turn it off. Server 38, based on the above-mentioned Symbian OS, listens for messages from the application (on port 6789) and performs the specified actions.

Although the embodiments described herein make reference specifically to J2ME and the Java KVM, the principles of the present invention may similarly be applied to platform-independent applications that run on virtual machines of other sorts. Furthermore, although the specific embodiment described above uses TCP to for communication between application 30 and server 38, other communication protocols, such as UDP, may alternatively be used for this purpose if supported by KVM 32 and OS 36. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX A

SAMPLE SOURCE CODE

```
public class BacklightManager {
    private static BacklightManager   backLight        = null;
    private final byte                BACKLIGHT_ON     = 100;
    private final byte                BACKLIGHT_OFF    = 101;
    // the default port for the communication
    private final int PORT = 6789;
    private final String URL = "socket://127.0.0.1:";
    // flag to tell us if we are connected or not.
    private Boolean connected = false;
    // flag to tell us the state of the backlight
    private Boolean backLightOn = false;
    // those variables are for the connection
    // and communication with the server.
    private StreamConnection    conn    = null;
    private DataInputStream     din     = null;
    private DataOutputStream    dout    = null;
    /**
     * This function will connect us to the Symbian.
     * We will open a connection and then write the on/off
     * byte for backlight option.
     *
     * @return status of connection
     */
    private synchronized boolean connect ( ) {
        // we check to see if the flag is true
        // in case that some thread was waiting for this
        // function and meanwhile another thread already
        // opened a connection.
        // we also check to see if the connection was
        // closed for some reason.
        if (connected && conn != null)
            return connected;
        try {
            // open connection
            conn = (StreamConnection) Connector.open (URL + PORT, Connector.READ_WRITE, true);
            // open the data input stream
            din = new DataInputStream (conn.openInputStream ( ));
            // open the data output stream
            dout = new DataOutputStream (conn.openOutputStream ( ));
            // set the connectivity flag
            connected = true;
        } catch (Exception e) {
            connected = false;
            e.printStackTrace ( );
        }
        return connected;
    } public synchronized void start ( ) {
        // first check to see that the light is off
        if (backLightOn)
            return;
        // try to connect.
        // if we are already connected the function will
        // do nothing
        // since we check it in the connect method.
        if (connect ( ))
        {
            try {
                dout.writeByte(BACKLIGHT_ON);
                dout.flush ( );
                backLightOn = true;
            } catch (IOException e) {
            }
        }
    }
    /**
     * Stop the backlight
     * The stop simply turn on the flag by sending
     * byte to the symbian
     *
     * @return
     */
    public synchronized void stop ( ) {
        // first check to see that the light is off
        if (!backLightOn)
            return;
        // try to connect.
        // if we are already connected the function will
        // do nothing
        // since we check it in the connect method.
        if (connect ( ))
        {
            try {
                dout.writeByte(BACKLIGHT_OFF);
                dout.flush ( );
                backLightOn = false;
            } catch (IOException e) {
            }
        }
    }
    /**
     * This function will clean the flags we use
     * and will close all opened connections.
     **/
    public void destroy ( ) {
        // stop the backlight if its turn on
        stop ( );
        // set the flags to the initial state
        connected = false;
        backLightOn = false;
        try {
            if (conn != null)
                conn.close ( );
```

APPENDIX A-continued

SAMPLE SOURCE CODE

```
        if (din != null)
            din.close ( );
        if (dout != null)
            dout.close ( );
    } catch (Exception e) {
        // do nothing
    } finally {
        conn = null;
        din = null;
        dout = null;
        }
    }
}
```

The invention claimed is:

1. A method for operating a mobile computing device, comprising:
running a platform-independent application program using a virtual machine operating on the mobile computing device;
running a server program on the mobile computing device so as to access a native function of the mobile computing device that is not supported by the virtual machine; and
invoking the native function from the platform-independent application program by:
opening a communication connection to the server program using a communication application programming interface (API) of the virtual machine;
sending a message to the server program via the communication connection, so as to cause the server program to access the native function;
running the native function by the server program; and
sending a reply to the message from the server program to the platform-independent application program returning a result of the native function.

2. The method according to claim 1, wherein running the platform-independent application program comprises running a Java program using a K Virtual Machine (KVM).

3. The method according to claim 1, wherein invoking the native function comprises invoking an input/output (I/O) function of the mobile computing device that is not supported by the virtual machine.

4. The method according to claim 3, wherein the I/O function comprises receiving data via a communication port of the mobile computing device.

5. The method according to claim 3, wherein the I/O function comprises playing a sound.

6. The method according to claim 3, wherein the I/O function comprises driving a display of the mobile computing device.

7. The method according to claim 3, wherein the I/O function comprises operating a backlight of a display of the mobile computing device.

8. The method according to claim 1, wherein invoking the native function comprises interacting with a peripheral device.

9. The method according to claim 1, wherein opening the communication connection comprises opening the connection using a network communication protocol.

10. The method according to claim 9, wherein using the network communication protocol comprises opening a Transmission Control Protocol/Internet Protocol (TCP/IP) connection.

11. The method according to claim 10, wherein sending the message comprises sending a Hypertext Transfer Protocol (HTTP) request to a Uniform Resource Identifier (URI) that is associated with the server program.

12. The method according to claim 1, wherein sending the message comprises sending a User Datagram Protocol (UDP) packet.

13. A mobile computing device comprising a microprocessor, the microprocessor is programmed to:
run a platform-independent application program using a virtual machine operating on the mobile computing device;
run a server program on the mobile computing device so as to access a native function of the mobile device that is not supported by the virtual machine;
invoke the native function from the platform-independent application program by:
opening a communication connection to the server program using a communication application programming interface (API) of the virtual machine; and
sending a message to the server program via the communication connection, so as to cause the server program to access the native function; and
run the server program to execute the native function,
wherein the server program is adapted to send a reply to the message to the platform-independent application program returning a result of the native function.

14. The device according to claim 13, wherein the platform-independent application program comprises a Java program, and the virtual machine comprises a K Virtual Machine (KVM).

15. The device according to claim 13, wherein the native function comprises an input/output (I/O) function of the mobile computing device that is not supported by the virtual machine.

16. The device according to claim 15, and comprising a communication port, wherein the I/O function comprises receiving data via the communication port.

17. The device according to claim 15, and comprising a speaker, wherein the I/O function comprises playing a sound via the speaker.

18. The device according to claim 15, and comprising a display, wherein the I/O function comprises driving the display.

19. The device according to claim 15, and comprising a display having a backlight, wherein the I/O function comprises operating the backlight.

20. The device according to claim 13, wherein the native function comprises interacting with a peripheral device.

21. The device according to claim 13, wherein the microprocessor is programmed to open the connection using a network communication protocol.

22. The device according to claim 21, wherein the network communication protocol comprises at least one of a Transmission Control Protocol (TCP), a User Datagram Protocol (UDP) and an Internet Protocol (IP).

23. The device according to claim 13, wherein the microprocessor is programmed to send the message by sending a Hypertext Transfer Protocol (HTTP) request to a Uniform Resource Identifier (URI) that is associated with the server program.

* * * * *